(12) United States Patent
Harada et al.

(10) Patent No.: US 9,105,277 B1
(45) Date of Patent: Aug. 11, 2015

(54) CONTROLLER, DISK DRIVE, AND READ PROCESSING METHOD

(71) Applicant: Kabushiki Kaisha Toshiba, Minato-ku (JP)

(72) Inventors: Kohsuke Harada, Yokohama (JP);
Akihiro Yamazaki, Yokohama (JP);
Nobuhiro Maeto, Yokohama (JP);
Kazuto Kashiwagi, Yokohama (JP);
Naoki Tagami, Yokohama (JP);
Masahiro Kanamaru, Kawasaki (JP);
Tomokazu Okubo, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/481,187

(22) Filed: Sep. 9, 2014

Related U.S. Application Data (60) Provisional application No. 61/976,914, filed on Apr. 8, 2014.

(51) Int. Cl.
```
G11B 5/02      (2006.01)
G11B 27/36     (2006.01)
G11B 5/012     (2006.01)
G11B 5/596     (2006.01)
```

(52) U.S. Cl.
CPC .................................... *G11B 5/012* (2013.01)

(58) Field of Classification Search
CPC .......... G11B 5/012; G11B 27/36; G11B 5/02; G11B 2220/20; G11B 5/5967; G11B 5/5534; G11B 21/106; G11B 5/00; G11B 5/09; G11B 5/035

USPC ............... 360/25, 31, 55, 65, 72.2, 75, 77.05, 360/77.06, 77.14

See application file for complete search history.

(56) References Cited

U.S. PATENT DOCUMENTS

| | | | |
|---|---|---|---|
| 6,476,992 B1 | 11/2002 | Shimatani | |
| 7,869,327 B2 * | 1/2011 | Miyashita et al. | ......... 369/53.35 |

FOREIGN PATENT DOCUMENTS

| | | |
|---|---|---|
| JP | 11-213310 | 8/1999 |
| JP | 2001-23136 | 1/2001 |
| JP | 2008-293558 | 12/2008 |

OTHER PUBLICATIONS

Rathnakumar Radhakrishnan, et al., "Estimation of Areal Density Gains of TDMR System with 2D Detector"; IEICE; Oct. 26-29, 2014; pp. 674-678.

* cited by examiner

*Primary Examiner* — Nabil Hindi
(74) *Attorney, Agent, or Firm* — Oblon, McClelland, Maier & Neustadt, L.L.P.

(57) ABSTRACT

According to one embodiment, an equalizer is configured to obtain a noise included in a first correction signal by using a noise component of a first track and a noise interference component from a second track. The equalizer is configured to correct the first correction signal by using the obtained noise. The equalizer is configured to equalize the corrected first correction signal. The noise component of the first track is calculated based on a noise component of the first track at a first timing and a noise component of the first track at a second timing earlier than the first timing. The noise interference component from the second track is calculated based on a noise interference component from the second track at the first timing and a noise interference component from the second track at the second timing. The decoder is configured to decode the equalized first correction signal.

20 Claims, 5 Drawing Sheets

CONTROLLER, DISK DRIVE, AND READ PROCESSING METHOD

CROSS-REFERENCE TO RELATED APPLICATIONS

This application is based upon and claims the benefit of priority from Provisional Application No. 61/976,914, filed on Apr. 8, 2014; the entire contents of which are incorporated herein by reference.

FIELD

Embodiments described herein relate generally to a controller, a disk drive, and a read processing method.

BACKGROUND

In recent years, in a field of disk drives such as a hard disk drive, data is stored in a magnetic disk with higher density. Along with this, narrower track pitches of the magnetic disk are being used. If off-track in the direction along the track width happens when reading out data from a magnetic disk having a narrow track pitch using a magnetic head, the data written on the track may not be read out correctly. In another case, if off-track in the direction along the track width happens when writing data on a magnetic disk having a narrow track pitch using a magnetic head, the data written on the track may not be read out correctly by the magnetic head.

DETAILED DESCRIPTION

In general, according to one embodiment, there is provided a controller including an interference canceller, an equalizer, and a decoder. The interference canceller is configured to produce a first correction signal and a second correction signal. The first correction signal is obtained by cancelling a signal interference component from a second track in a signal of a first track. The second correction signal is obtained by cancelling a signal interference component from the first track in a signal of the second track. The first track and the second track are adjacent to each other in a disk medium. The equalizer is configured to obtain a noise included in the first correction signal by using a noise component of the first track and a noise interference component from the second track. The equalizer is configured to correct the first correction signal by using the obtained noise. The equalizer is configured to equalize the corrected first correction signal. The noise component of the first track is calculated based on a noise component of the first track at a first timing and a noise component of the first track at a second timing which is earlier than the first timing. The noise interference component from the second track is calculated based on a noise interference component from the second track at the first timing and a noise interference component from the second track at the second timing. The decoder is configured to decode the equalized first correction signal.

Exemplary embodiments of a disk drive will be explained below in detail with reference to the accompanying drawings. The present invention is not limited to the following embodiments.

Embodiments

Figure 1:
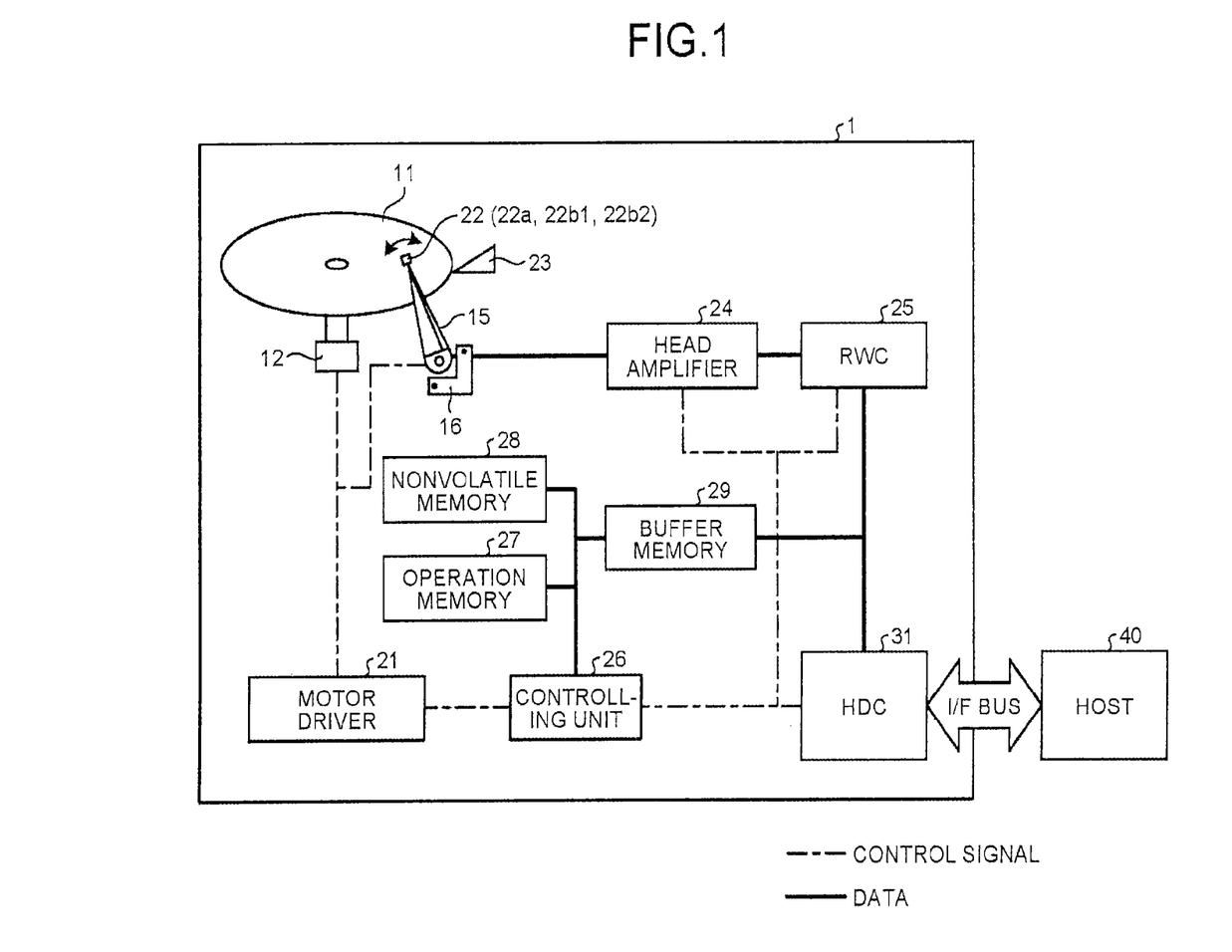
FIG. 1 illustrates a configuration of a disk drive according to an embodiment.

A disk drive 1 according to the embodiment will be described using FIG. 1. FIG. 1 illustrates a configuration of the disk drive 1.

For example, the disk drive 1 is an apparatus configured to record information on a magnetic disk (disk medium) 11 via a magnetic head 22 and to read out a signal from the magnetic disk (disk medium) 11 via the magnetic head 22. For example, the disk drive 1 may be a magnetic disk drive (e.g., a hard disk drive). Specifically, the disk drive 1 includes the magnetic disk 11, a spindle motor 12, a motor driver 21, the magnetic head 22, an actuator arm 15, a voice coil motor (VCM) 16, a ramp 23, a head amplifier 24, a read/write channel (RWC) 25, a hard disk controller (HDC) 31, a buffer memory 29, and a controlling unit 26.

The magnetic disk 11 is configured to rotate at a predetermined rotational speed about a rotational axis by the spindle motor 12. The motor driver 21 drives the spindle motor 12 to rotate.

The magnetic head 22 writes data on and reads out data from the magnetic disk 11 using a recording head 22a and a plurality of read heads 22b1 and 22b2 which are included in the magnetic head 22. For example, the magnetic head 22 can read out a signal from a plurality of adjacent tracks on the magnetic disk 11 using the plurality of read heads 22b1 and 22b2 (see FIG. 5 and FIG. 6). Further, the magnetic head 22 is located at a distal end of the actuator arm 15, and is moved along the radial direction (direction along the track width) of the magnetic disk 11 by the voice coil motor 16 driven by the motor driver 21. In such states, for example, when the magnetic disk 11 is not rotating, the magnetic head 22 is retracted to be on the ramp 23.

The head amplifier 24 amplifies and outputs the signal read out from the magnetic disk 11 by the magnetic head 22, and supplies the amplified signal to the read/write channel 25. The head amplifier 24 amplifies the signal, which is supplied from the read/write channel 25 and is to be written on the magnetic disk 11, and supplies the amplified signal to the magnetic head 22.

The hard disk controller 31 controls transmission of data with a host computer 40 via an I/F bus, controls the buffer memory 29, and performs processing of correcting errors in the recorded data. Further, the buffer memory 29 is used as a cache for data transmitted with the host computer 40. Further, for example, the buffer memory 29 is used to temporarily store therein data read out from the magnetic disk 11, data to be written on the magnetic disk 11, or firmware for control which is read out from the magnetic disk 11.

The read/write channel 25 performs code modulation of the data, which is supplied from the hard disk controller 31 and to be written on the magnetic disk 11, and supplies the code modulated data to the head amplifier 24. Further, the read/write channel 25 performs code demodulation of the signal, which is read out by the magnetic disk 11 and supplied from the head amplifier 24, and outputs the code demodulated data to the hard disk controller 31 as digital data.

To the controlling unit 26, an operation memory 27 (e.g., SRAM: Static Random Access Memory), a nonvolatile memory 28 (e.g., Flash ROM: Flash Read Only Memory), and the buffer memory 29 for temporary storage (e.g., DRAM: Dynamic Random Access Memory) are connected. The controlling unit 26 totally controls the disk drive 1 according to the firmware previously stored in the nonvolatile memory 28 and the magnetic disk 11. The firmware includes initial firmware and control firmware used for normal operation. The initial firmware which is executed first on starting is stored in, for example, the nonvolatile memory 28. As described below, a part of the function of a controller CTR (see FIG. 6) may be included in the control firmware. Further, the control firmware used for normal operation is recorded on the magnetic disk 11 and temporarily read out from the magnetic disk 11 into the buffer memory 29, and then stored in the operation memory 27, controlled by the initial firmware.

In the disk drive 1, the recording head 22a writes data on a plurality of tracks provided, in a plurality of concentric circles, on the magnetic disk 11 in such manner, for example, from the inner side toward the outer side or from the outer side toward the inner side. In this step, the buffer memory 29 temporarily stores therein the data already written on the track. For example, when the data is written from the inner side toward the outer side, the buffer memory 29 temporarily stores the data already written on the track until at least the writing of data on the sector on the outer adjacent track is completed.

In the disk drive 1, to increase the storage capacity of the magnetic disk 11, that is, to improve the recording density of the magnetic disk 11, the track width (track pitch) of the magnetic disk 11 may be approximately as narrow as the width of each read heads 22b1 and 22b2.

Among the plurality of read heads 22b1 and 22b2, the read head 22b1 will be focused here as an example. Considering the case in which the data is written on track A and track B without pushing the recording head 22a off track, and the data is read out from track A via the read head 22b1, as illustrated in a dashed line in FIG. 2. When viewed from the read head 22b1, track A is a target track of the present read processing and track B is an adjacent track which is adjacent to the target track.

Figure 2:
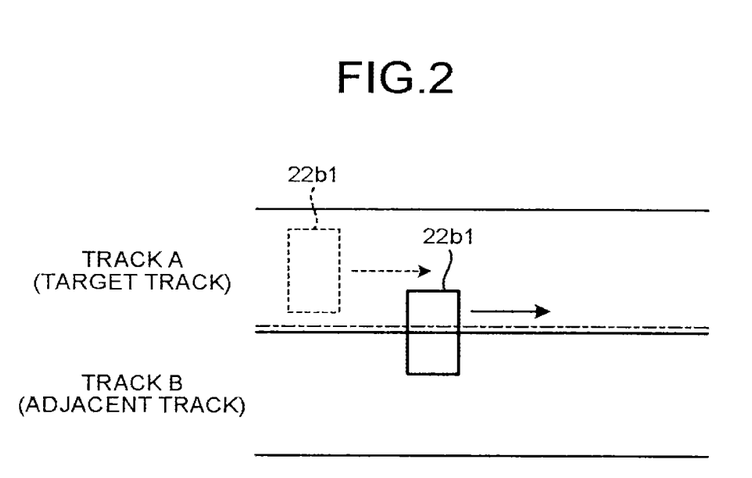
FIG. 2 illustrates an operation of the disk drive according to the embodiment.

In the disk drive 1, when the read head 22b1 reads out data, since the track width of the magnetic disk 11 can be approximately as narrow as the width of the read head 22b1, the read head 22b1 may be pushed into an off-track position shifted in the track width direction toward the adjacent track (track B) as illustrated in a solid line in FIG. 2 from an on-track position within the target track (track A) as illustrated in a dashed line in FIG. 2. If an off-track in the direction along the track width happens during readout of the data, the read head 22b1 may read out data from the target track (track A) receiving interference from data on the adjacent track (track B).

Figure 3:
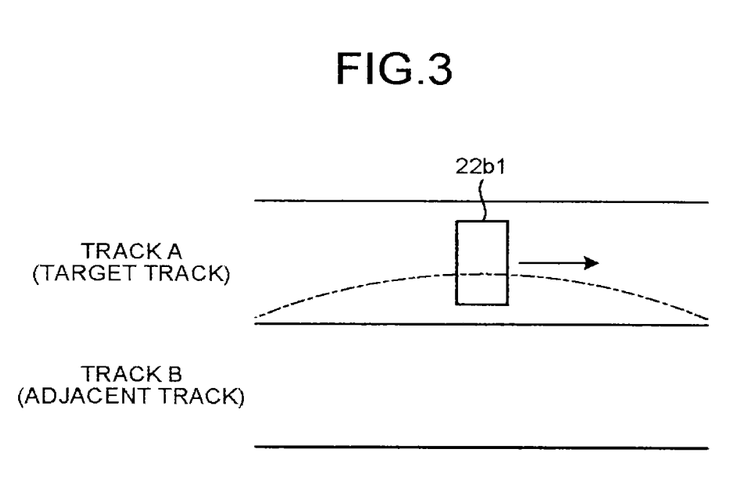
FIG. 3 illustrates an operation of the disk drive according to the embodiment.

For example, considering another case in which the data is written on track A and track B with pushing the recording head 22a into off-track position in the direction along the track width, and is read out from track A via the read head 22b1, as illustrated in a dashed line in FIG. 3. That is, when viewed from the read head 22b1, track A is a target track of the present read processing and track B is an adjacent track which is adjacent to the target track.

In the disk drive 1, the track width of the magnetic disk 11 is approximately as narrow as the width of the read head 22b1. Therefore, even when the read head 22b1 is, without being pushed into an off-track position, located at on-track position within the target track (track A) as illustrated in a solid line in FIG. 3 when reading out the data by the read head 22b1, the read head 22b1 may receive interference from data on the adjacent track (track B). That is, when an off-track in the direction along the track width happens during writing, the read head 22b1 may read out data from the target track (track A) while receiving interference from data on the adjacent track (track B).

For this reason, the disk drive 1 employs ITI (Inter Track Interference) cancelling method in which readout from a disk is performed using the data on the adjacent track to remove an interference component between tracks during reading out data from the magnetic disk 11. In the ITI cancelling method, for example, an interference component between tracks (signal interference component) is removed from the signal of the sector to be readout, where each interference component between tracks is in accordance with the data written on sectors adjacent, in the direction along the track width, to the signal of the sector to be read out. In this manner, the signal interference component from the adjacent track can be removed from the signal read out from the target track.

Now, considering the case when the signal with the signal interference component cancelled is equalized by a Viterbi equalizer in which a partial response signal is used in a read processing method to increase the recording density by allowing interference between symbols (interference between symbol waveforms at different points of time) happening on the transmission line of the magnetic recording. To further increase the recording density, it is effective to perform equalization taking into account the interference, on the time axis, of the jitter noise itself produced on the medium together with the interference between symbols of read signals. Therefore, a Viterbi equalizer in which an auto regressive model is applied for calculating branch metric (likelihood) may be used to remove influence of noise itself on interference between samples.

This model simply means that if the noise at time t can be recognized, each noise at each time t+1, t+2, . . . can be estimated, since the noise component included in the read signal obtained at time t by a read head has an effect on each time t+1, t+2, . . . . It is understood that noise can efficiently be suppressed by estimating the noise using the auto regressive model and correcting the signal with the estimated noise.

However, since the auto regressive model is configured for a single read head, further devising is necessary to apply the auto regressive model to the disk drive 1 including a plurality of read heads 22b1 and 22b2.

At first, in the embodiment, the disk drive 1 performs cancelling of the interference component between tracks (ITI cancelling) with using signals read out from a plurality of adjacent tracks by the plurality of read heads 22b1 and 22b2.

For example, the read signal obtained by two read heads 22b1 and 22b2 is discretized through a preamplifier, a low pass filter, and an A/D converter which are independently provided. The obtained two discretized read signals are input to two FIR filters for each, that is, total four FIR filters. The FIR filters are set so that each of two sets of FIR filters, to which two read signals are input, outputs two different read target. That is, four FIR filters are operated so that two sets of FIR filters, each set receiving two read signals as input, output two different read targets (PR (Partial Response) targets) to obtain two different discretized read signals.

Figure 4:
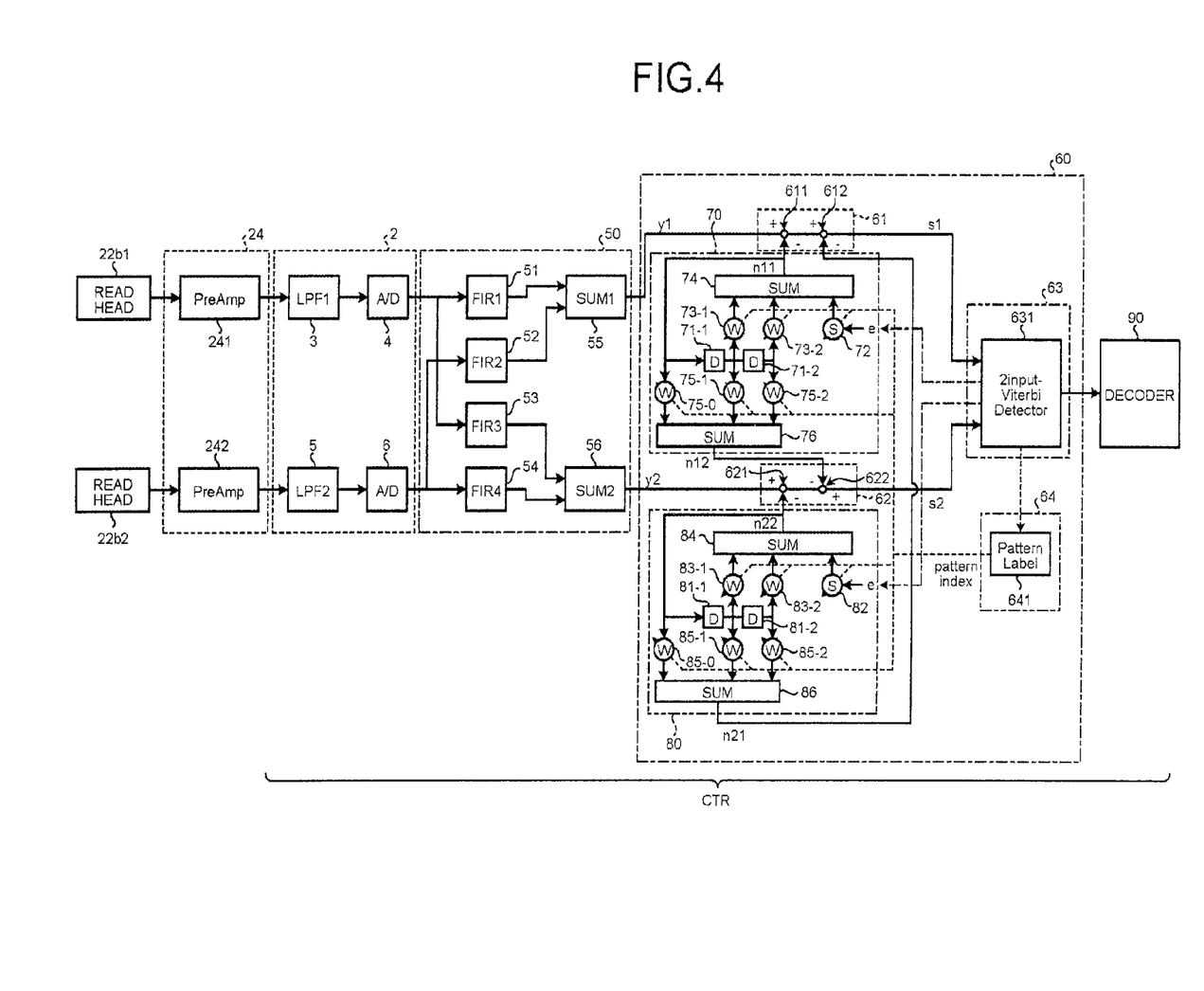
FIG. 4 illustrates a configuration of a controller of the embodiment.

Specifically, the disk drive 1 of the embodiment provides the controller CTR having a function as illustrated in FIG. 4. FIG. 4 illustrates the configuration of the controller CTR. Note that, the controller CTR illustrated in FIG. 4 has a functional configuration. For example, the controller CTR may be implemented as a hardware (e.g., as a system on a chip) in the read/write channel 25 or the like. Alternatively, for example, the controller CTR illustrated in FIG. 4 may be implemented as a software (e.g., as a functional module extracted into the operation memory 27 or the like at once or sequentially according to the progress of processing, by the controlling unit 26 or the like) in the controlling unit 26 or the like. Further alternatively, a part of the function of the controller CTR illustrated in FIG. 4 may be implemented as a hardware in the read/write channel 25 or the like and the rest of the function may be implemented as a software in the controlling unit 26 or the like.

Figure 5:
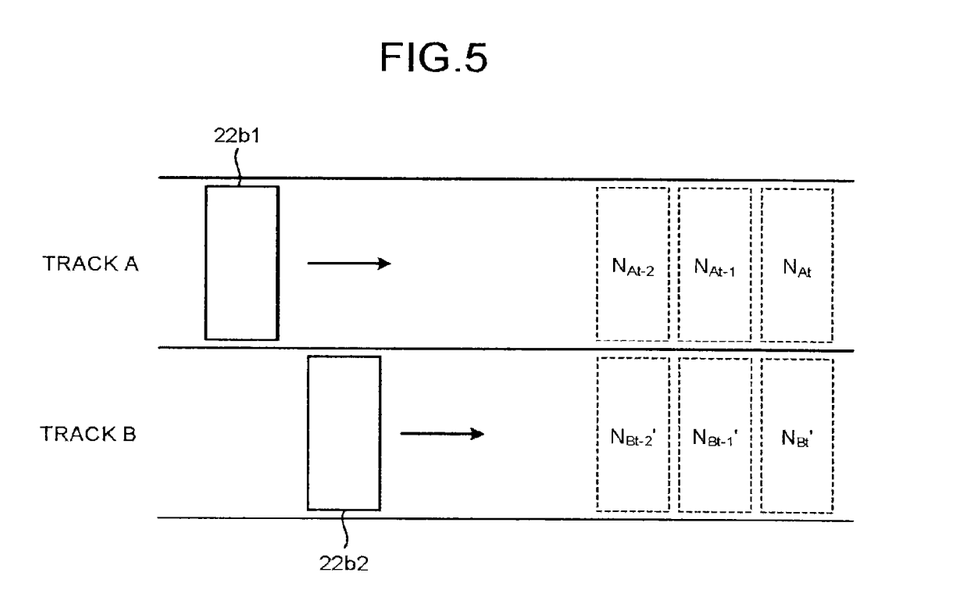
FIG. 5 illustrates the operation of the disk drive according to the embodiment.

In the disk drive 1, the plurality of read heads 22b1 and 22b2 illustrated in FIG. 4 is configured to read out a signal from a plurality of adjacent tracks. For example, as illustrated in FIG. 5, when the read head 22b1 reads out a read signal $RS_A$ from the first track (track A), the read head 22b2 reads out a read signal $RS_B$ from the second track (track B) adjacent to the first track. When viewed from the read head 22b1, track A is a target track and track B is an adjacent track. Contrarily, when viewed from the read head 22b2, track B is a target track and track A is an adjacent track.

Note that, exemplarily illustrated in FIG. 4 is the case in which two read heads 22b1 and 22b2 read out a signal from the plurality of adjacent tracks. However, it may be configured to read out a signal from the first track using one of, or some of, three or more read heads, and to read out a signal from the second track using the rest of the read heads.

The head amplifier 24 illustrated in FIG. 4 amplifies a plurality of read signals $RS_A$ and $RS_B$ read out from a plurality of adjacent tracks by the plurality of read heads 22b1 and 22b2. For example, the head amplifier 24 includes a plurality of preamplifiers 241 and 242 corresponding to the plurality of read heads 22b1 and 22b2. The preamplifier 241 amplifies the read signal $RS_A$ read out from the read head 22b1 and supplies the amplified signal $RS_A$ to the controller CTR. The preamplifier 242 amplifies the read signal $RS_B$ read out from the read head 22b2 and supplies the amplified signal $RS_B$ to the controller CTR.

The controller CTR includes a signal processing unit 2, an interference canceller 50, a Viterbi equalizer 60, and a decoder 90.

The signal processing unit 2 processes a plurality of read signals $RS_A$ and $RS_B$ supplied from the head amplifier 24. For example, the signal processing unit 2 includes a low pass filter (LPF1) 3, an A/D converter 4, a low pass filter (LPF2) 5, and an A/D converter 6.

The low pass filter 3 removes the out-band component from the read signal $RS_A$ supplied from the preamplifier 241 and then supplies the read signal $RS_A$ to the A/D converter 4. The A/D converter 4 performs A/D conversion of the read signal from which the radio frequency component is removed to produce a digital signal $RD_A$, and then supplies the digital signal $RD_A$ to the interference canceller 50.

The low pass filter 5 removes the out-band component from the read signal $RS_B$ supplied from the preamplifier 242 and then supplies the read signal $RS_B$ to the A/D converter 6. The A/D converter 6 performs A/D conversion of the read signal from which the out-band component is removed to produce a digital signal $RD_B$, and then supplies the digital signal $RD_B$ to the interference canceller 50.

The interference canceller 50 produces a first correction signal y1 by cancelling a signal interference component $S_A'$ from the second track (track B) in the read signal $RS_A$ read out from the first track (track A). Along with this, the interference canceller 50 produces a second correction signal y2 by cancelling the signal interference component $S_B'$ from the first track (track A) in the read signal $RS_B$ read out from the second track (track B).

For example, the interference canceller 50 includes an FIR filter (FIR1) 51, an FIR filter (FIR2) 52, an FIR filter (FIR3) 53, an FIR filter (FIR4) 54, a cancel processing unit (SUM1) 55, and a cancel processing unit (SUM2) 56.

The FIR filter 51 extracts a signal component $S_A$ from the signal read out from the first track (track A). The FIR filter 51 receives the digital signal $RD_A$ from the A/D converter 4. The FIR filter 51 equalizes the digital signal $RD_A$ to an arbitrary PR (Partial Response) target (e.g., a PR target such as PR (1, 2, 2, 2, 1)). The FIR filter 51 supplies the digital signal $S_A$ obtained by equalization to the cancel processing unit 55 as a signal component.

The FIR filter 52 extracts a signal interference component $S_A'$ from the signal read out from the second track (track B). The FIR filter 52 receives the digital signal $RD_B$ from the A/D converter 6. The FIR filter 52 equalizes the digital signal $RD_B$ to an arbitrary PR (Partial Response) target (e.g., a PR target such as PR (1, 1, 2, 1, 1)). Then, by a process, such as applying a predetermined coefficient to the digital signal $S_B$ obtained by equalization, the FIR filter 52 produces a signal interference component $S_A'$. The FIR filter 52 supplies the produced signal interference component $S_A'$ to the cancel processing unit 55.

The FIR filter 53 extracts a signal interference component $S_B'$ from the signal read out from the first track (track A). The FIR filter 53 receives the digital signal $RD_A$ from the A/D converter 4. The FIR filter 53 equalizes the digital signal $RD_A$ to an arbitrary PR (Partial Response) target (e.g., a PR target such as PR (1, 2, 2, 2, 1)). Then, by a process, such as applying a predetermined coefficient to the digital signal $S_A$ obtained by equalization, the FIR filter 53 produces a signal interference component $S_B'$. The FIR filter 53 supplies the produced signal interference component $S_B'$ to the cancel processing unit 56.

The FIR filter 54 extracts a signal component $S_B$ from the signal read out from the second track (track B). The FIR filter 54 receives the digital signal $RD_B$ from the A/D converter 6. The FIR filter 54 equalizes the digital signal $RD_B$ to an arbitrary PR (Partial Response) target (e.g., a PR target such as PR (1, 1, 2, 1, 1)). The FIR filter 54 supplies the digital signal $S_B$ obtained by equalization to the cancel processing unit 56 as a signal component.

The cancel processing unit 55 produces the first correction signal y1 using the signal component $S_A$ extracted by the FIR filter 51 and the signal interference component $S_A'$ extracted by the FIR filter 52. For example, the cancel processing unit 55 performs calculation expressed by Equation 1 described below to produce the first correction signal y1.

$$y1 = S_A + S_A' \qquad \text{Equation 1}$$

The cancel processing unit 56 produces the second correction signal y2 using the signal component $S_B$ extracted by the FIR filter 54 and the signal interference component $S_B'$ extracted by the FIR filter 53. For example, the cancel processing unit 56 performs calculation expressed by Equation 2 described below to produce the second correction signal y2.

$$y2 = S_B + S_B' \qquad \text{Equation 2}$$

The obtained two correction signals y1 and y2 are targeted to different reference targets (PR targets) and thereby have different noise profiles, respectively. Further, noise components included in two different correction signals y1 and y2 may be correlated to each other.

Therefore, in the embodiment, the disk drive 1 estimates noise by taking into account not only the interference between samples of noises included in signals of the target track but also the interference between samples of the noise interference components which is a component included in a noise component in a signal of the adjacent track and is a component interfering with the noise component in the target track, when the disk drive 1 performs ITI cancelling with using signals read out a plurality of adjacent tracks by the plurality of read heads 22b1 and 22b2, in order to achieve improvement in estimation accuracy of noise.

For example, to estimate the noise component, the auto regressive moving average model as illustrated in FIG. 4 is applied to two correction signals output from the interference canceller 50.

That is, when focusing on the read head 22b1 and considering track A as the target track, a noise component $N_A t$ in the first correction signal y1 at the present time t receives time-correlated effect from noise components $N_A t$-1 and $N_A t$-2 in the first correction signal y1 at past points of time t-1 and t-2, as illustrated in FIG. 5. Along with this, the noise component $N_A t$ in the first correction signal y1 at the present time t also receives effect from noise interference components $N_B t'$, $N_B t$-1', and $N_B t$-2' which are interference components of noise components in the second correction signal y2 at the present time t and the past points of time t-1 and t-2 with the noise component in the first correction signal y1. Therefore, as for the first correction signal y1, the noise included in the first correction signal y1 at the present time t is estimated by using the auto regressive model of the noise component included in the first correction signal y1 and the moving average model of the noise interference component in the second correction signal y2.

Figure 6:
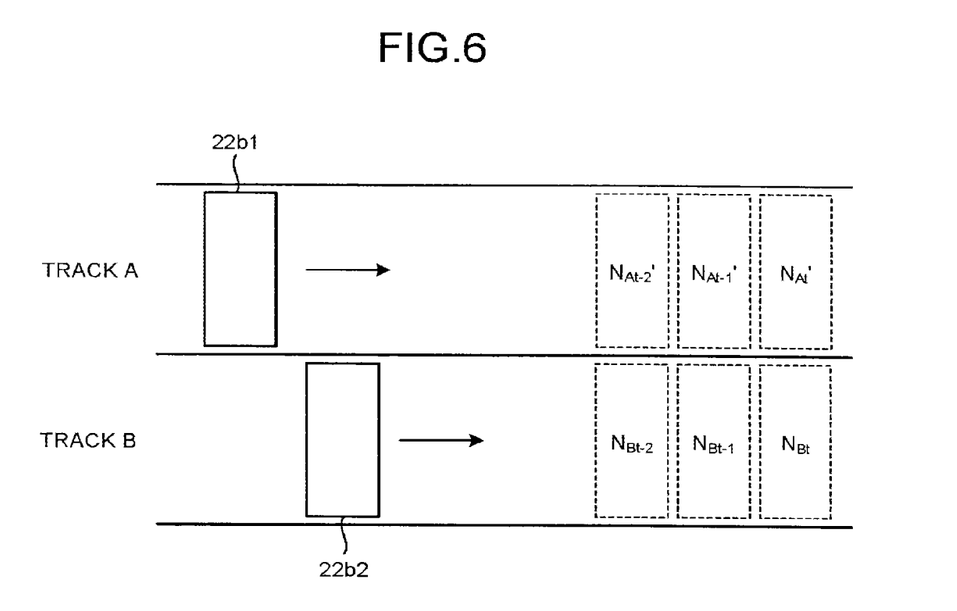
FIG. 6 illustrates the operation of the disk drive according to the embodiment.

Further, when focusing on the read head 22b2 and considering track B as the target track, the noise component $N_B t$ in the second correction signal y2 at the present time t receives time-correlated effect from noise components $N_B t$-1 and $N_B t$-2 in the second correction signal y2 at past points of time t-1 and t-2, as illustrated in FIG. 6. Along with this, the noise component $N_B t$ in the second correction signal y2 at the present time t also receives effect from noise interference components $N_A t'$, $N_A t$-1', and $N_A t$-2' which are interference components of noise components in the first correction signal y1 at the present time t and the past points of time t-1 and t-2 with the noise component in the second correction signal y2. Therefore, as for the second correction signal y2, the noise included in the second correction signal y2 at the present time t is estimated by using the auto regressive model of the noise component included in the second correction signal y2 and the moving average model of the noise interference component in the first correction signal y1.

Further, since the interference pattern of noise depends on the recording bit patterns of two different tracks, the coefficient for estimating noise is dynamically changed according to the branch label (pattern label 641) of the Viterbi equalizer 60 including recording bit strings of two tracks as a branch label. The branch label (pattern label 641) is configured that the recording bit strings of two tracks is distinguishable from each other. For example, in the branch label (pattern label 641), the bit string in the higher level corresponds to the bit string for track A and the bit string in the lower level corresponds to the bit string for track B.

At this time, the branch metric (likelihood) M which is considered in one time-transition used in the Viterbi equalizer 60 can be provided by Equation 3 described below.

$$M = -\log(\sqrt{\|R_i\|}) - z^T R_i^{-1} z \qquad \text{Equation 3}$$

In Equation 3, the first term corresponds to the dispersion of noise and the second term corresponds to the time correlation characteristic of noise. In Equation 3, Ri is a matrix representing noise dispersion of the recording bit string of two tracks which is expressed by Equation 4 described below. Further, z is a vector representing the Euclidean distance of time between signals of noise components, which is expressed by Equation 5 described below. As expressed by Equation 3, the branch metric (likelihood) M can accurately be obtained by improving the accuracy of noise estimation.

$$R_i = \begin{bmatrix} \sigma_a^2 & \sigma_a \sigma_b \\ \sigma_b \sigma_a & \sigma_b^2 \end{bmatrix} \qquad \text{Equation 4}$$

In Equation 4, $\sigma_a^2$ is a noise dispersion value of the read signal of the first track (track A) and $\sigma_b^2$ is a noise dispersion value of the read signal of the second track (track B). $\sigma_a \sigma_b$ is a noise dispersion value, by the interference from the first track (track A), in the read signal of the second track (track B). $\sigma_b \sigma_a$ is a noise dispersion value, by the interference from the second track (track B), in the read signal of the first track (track A).

$$z = \begin{bmatrix} (y_{at} - s_{at}) - \sum_{i=t-1}^{t-L} \overline{\omega}_{aai}(y_{ai} - s_{ai}) - \sum_{i=t}^{t-L} \overline{\omega}_{bai}(y_{bi} - s_{bi}) \\ (y_{bt} - s_{bt}) - \sum_{i=t-1}^{t-L} \overline{\omega}_{bbi}(y_{bi} - s_{bi}) - \sum_{i=t}^{t-L} \overline{\omega}_{abi}(y_{ai} - s_{ai}) \end{bmatrix} \qquad \text{Equation 5}$$

In Equation 5, $y_{at}$ is an amplitude of the first correction signal of the first track (track A) at the present time t, and $s_{at}$ is an amplitude, at the present time t, of the reference component for the first correction signal. $y_{ai}$ is an amplitude of the first correction signal of the first track (track A) at the past time i (i=t-1, . . . , t-L), and $s_{ai}$ is an amplitude, at the past time i (i=t-1, . . . , t-L), of the reference component for the first correction signal. In the embodiment, the case in which L=2 is exemplarily described to simplify the description. However, L may be three or more.

In Equation 5, $w_{aai}$ is a noise correlation coefficient representing correlation effect of the noise component in the first correction signal of the first track (track A) at the past time i (i=t-1, . . . , t-L) on the noise component at the present time t. $w_{aai}$ is expressed by Equation 6 described below.

$$\overline{\omega}_{aai} = c_a^{-1} h \qquad \text{Equation 6}$$

In Equation 6, $c_a$ and h are provided as components of autocovariance matrix nm representing time correlation characteristic of the noise component of the first track (track A). The autocovariance matrix $n_a$ is expressed by Equation 7 described below.

$$n_a = \begin{bmatrix} (n_{i-2}^a)^2 & n_{i-2}^a n_{i-1}^a & n_{i-2}^a n_i^a \\ n_{i-1}^a n_{i-2}^a & (n_{i-1}^a)^2 & n_{i-1}^a n_i^a \\ \hline n_i^a n_{i-2}^a & n_i^a n_{i-1}^a & (n_i^a)^2 \end{bmatrix} = \begin{bmatrix} c_a & h \\ \hline h^T & \sigma^2 \end{bmatrix} \begin{bmatrix} \varpi \\ 1 \end{bmatrix} = \begin{bmatrix} 0 \\ \sigma_w^2 \end{bmatrix}$$

Equation 7

In Equation 7, $n_i^a$ represents an amplitude of the noise component included in the first correction signal of the first track (track A) at the past time i. $n_{i-1}^a$ represents an amplitude of the noise component included in the first correction signal of the first track (track A) at the past time i-1. $n_{i-2}^a$ represents an amplitude of the noise component included in the first correction signal of the first track (track A) at the past time i-2. w represents the degree of time correlation which is experimentally obtained in advance. Components $n_i^a$ to $n_{i-2}^a$ may be different from each other according to the pattern label 641 (recording bit string of two tracks).

In Equation 5, $w_{bbi}$ is a noise correlation coefficient representing correlation effect of the noise component in the second correction signal of the second track (track B) at the past time i (i=t-1, ..., t-L) on the noise component at the present time t. $w_{bbi}$ is expressed by Equation 8 described below.

$$\overline{\omega}_{bbi} = c_b^{-1} h$$

Equation 8

In Equation 8, $c_b$ and h are provided as components of autocovariance matrix $n_b$ representing time correlation characteristic of the noise component of the second track (track B). The autocovariance matrix $n_b$ is expressed by Equation 9 described below.

$$n_b = \begin{bmatrix} (n_{i-2}^b)^2 & n_{i-2}^b n_{i-1}^b & n_{i-2}^b n_i^b \\ n_{i-1}^b n_{i-2}^b & (n_{i-1}^b)^2 & n_{i-1}^b n_i^b \\ \hline n_i^b n_{i-2}^b & n_i^b n_{i-1}^b & (n_i^b)^2 \end{bmatrix} = \begin{bmatrix} c_b & h \\ \hline h^T & \sigma^2 \end{bmatrix} \begin{bmatrix} \varpi \\ 1 \end{bmatrix} = \begin{bmatrix} 0 \\ \sigma_w^2 \end{bmatrix}$$

Equation 9

In Equation 9, $n_i^b$ represents an amplitude of the noise component included in the second correction signal of the second track (track B) at the past time i. $n_{i-1}^b$ represents an amplitude of the noise component included in the second correction signal of the second track (track B) at the past time i-1. $n_{i-2}^b$ represents an amplitude of the noise component included in the second correction signal of the second track (track B) at the past time i-2. w is a value representing the degree of time correlation which is experimentally obtained in advance. Components $n_i^b$ to $n_{i-2}^b$ may be different from each other according to the pattern label 641 (recording bit strings of two tracks).

In Equation 5, $w_{bai}$ is a noise interference correlation coefficient representing correlation effect of the noise interference component at the past time i (i=t-1, ..., t-L) on the noise interference component at the present time t, where the noise interference component is an interference component of the noise component in the second correction signal of the second track (track B) with the noise component in the first correction signal of the first track (track A) at the present time t. $w_{bai}$ is expressed by Equation 10 described below.

$$\overline{\omega}_{bai} = [h_{ba} h_a h_b]^T$$

Equation 10

In Equation 10, $h_{ba}$ and $h_a h_b$ are provided as components of cross-covariance matrix $n_a n_b$ representing time correlation characteristic of the noise interference component between the noise component of the first track (track A) and the noise component of the second track (track B). The cross-covariance matrix $n_a n_b$ is expressed by Equation 12 described below.

In Equation 5, $w_{abi}$ is a noise interference correlation coefficient representing correlation effect of the noise interference component at the past time i (i=t-1, ..., t-L) on the noise interference component at the present time t, where the noise interference component is an interference component of the noise component in the first correction signal of the first track (track A) with the noise component in the second correction signal of the second track (track B) at the present time t. $w_{abi}$ is expressed by Equation 11 described below.

$$\overline{\omega}_{abi} = [h_{ab}{}^T h_a h_b]^T$$

Equation 11

In Equation 11, $h_{ab}$ and $h_a h_b$ are provided as components of cross-covariance matrix $n_a n_b$ representing time correlation characteristic of the noise interference component between the noise component of the first track (track A) and the noise component of the second track (track B). The cross-covariance matrix $n_a n_b$ is expressed by Equation 12 described below.

$$n_a n_b = \begin{bmatrix} n_{i-2}^a n_{i-2}^b & n_{i-1}^a n_{i-2}^b & n_i^a n_{i-2}^b \\ n_{i-2}^a n_{i-1}^b & n_{i-1}^a n_{i-1}^b & n_i^a n_{i-1}^b \\ \hline n_{i-2}^a n_i^b & n_{i-1}^a n_i^b & n_i^a n_i^b \end{bmatrix} = \begin{bmatrix} c_{ab} & h_{ab} \\ \hline h_{ba} & h_a h_b \end{bmatrix}$$

Equation 12

By operating the Viterbi equalizer 60 using the branch metric (likelihood) M derived from Equation 3 to Equation 12, each of the noises included in read signals obtained from two different read heads 22b1 and 22b2 can be estimated accurately. Thereby, the noise can efficiently be suppressed and whitened.

Specifically, as illustrated in FIG. 4, the Viterbi equalizer 60 estimates a noise component n11 in the first correction signal y1 according to time correlation characteristic of the noise component. The Viterbi equalizer 60 also estimates a noise interference component n21, which interferes with the first correction signal y1, in the estimated second correction signal y2, according to time correlation characteristic of the noise interference component. The Viterbi equalizer 60 estimates the noise n1 included in the first correction signal y1 using the noise component n11 and the noise interference component n21. The Viterbi equalizer 60 corrects the first correction signal y1 using the estimated noise n1. For example, the Viterbi equalizer 60 corrects the first correction signal y1 by subtracting the noise n1 from the first correction signal y1. The Viterbi equalizer 60 equalizes the corrected first correction signal s1.

Further, the Viterbi equalizer 60 estimates the noise component n22 in the second correction signal y2 according to time correlation characteristic of the noise component. The Viterbi equalizer 60 also estimates the noise interference component n12, which interferes with the second correction signal y2, in the estimated fist correction signal y1, according to time correlation characteristic of the noise interference component. The Viterbi equalizer 60 estimates the noise n2 included in the second correction signal y2 using the noise component n22 and the noise interference component n12.

The Viterbi equalizer 60 corrects the second correction signal y2 using the estimated noise n2. For example, the Viterbi equalizer 60 corrects the second correction signal y2 by subtracting the noise n2 from the second correction signal y2. The Viterbi equalizer 60 equalizes the corrected second correction signal s2.

The Viterbi equalizer 60 includes a first estimation unit (the first calculation unit) 70, a second estimation unit (the second calculation unit) 80, a first correction unit 61, a second correction unit 62, an equalization processing unit 63, and an index convertor 64.

The first estimation unit 70 estimates the noise component n11 in the first correction signal y1 according to time correlation characteristic of the noise component. The first estimation unit 70 also estimates the noise interference component n12, which interferes with the second correction signal y2, in the first correction signal y1, according to time correlation characteristic of the noise interference component. That is, the first estimation unit 70 calculates the noise component n11 of the first track (track A) based on the noise component of the first track at the first time (time t) and the noise component of the first track at the second time (time t-1 and t-2) which is earlier than the first time. Along with this, the first estimation unit 70 calculates the noise interference component n12 of the first track based on the noise interference component of the first track at the first time and the noise interference component of the first track at the second time. The first estimation unit 70 supplies the noise component n11 to the first correction unit 61 and the noise interference component n12 to the second correction unit 62.

For example, the first estimation unit 70 includes multiple stages of first delay units 71-1 and 71-2, a multiplication unit 72, a plurality of first multiplication units 73-1 and 73-2, a first add-up unit 74, a plurality of third multiplication units 75-0, 75-1, and 75-2, and a third add-up unit 76.

The multiple stages of first delay units 71-1 and 71-2 produce a plurality of noise components having different delays from the noise component n11 estimated by the first estimation unit 70. For example, the first delay unit 71-1 receives the noise component n11 from the first add-up unit 74 and delays the noise component n11 by a delay D. Then, the first delay unit 71-1 outputs the noise component delayed by the delay D to the first multiplication unit 73-1, the first delay unit 71-2, and the third multiplication unit 75-1. The first delay unit 71-2 further delays, by the delay D, the noise component already delayed by the delay D, and outputs the noise component delayed by twice the delay D to the first multiplication unit 73-2 and the third multiplication unit 75-2.

The multiplication unit 72 receives a noise basic component 'e' from the equalization processing unit 63, and a pattern index from the index convertor 64. The pattern index is an identifier for identifying which path the pattern label 641 including the recording bit string of the two tracks corresponds to among a plurality of paths to be processed by the equalization processing unit 63. The multiplication unit 72 has a table in which a plurality of pattern indexes is associated with a noise producing coefficient S. The multiplication unit 72 selects a noise producing coefficient S corresponding to a received pattern index according to the table. The multiplication unit 72 produces a noise component $n_t$ at the present time t by multiplying the noise basic component κ by the noise producing coefficient S, and outputs the noise component $n_t$ to the first add-up unit 74.

The plurality of the first multiplication units 73-1 and 73-2 multiplies each of noise components output from first delay units of different stages among the first delay units 71-1 and 71-2 of multiple stages by the noise correlation coefficient (see FIG. 6) corresponding to time correlation characteristic of the noise component, and outputs the obtained product as a noise component.

For example, the first multiplication unit 73-1 receives the noise component delayed by the delay D from the first delay unit 71-1, and a pattern index from the index convertor 64. The first multiplication unit 73-1 has a table in which a plurality of pattern indexes is associated with a noise correlation coefficient $w_{aat-1}$. The first multiplication unit 73-1 selects the noise correlation coefficient $w_{aat-1}$ corresponding to the received pattern index according to the table, and multiplies the noise component, delayed by the delay D, by the noise correlation coefficient $w_{aat-1}$. Thereby, the first multiplication unit 73-1 produces a noise component $\Delta n_{t,t-1}$ which the noise component $n_t$ at the present time t receives from the noise component $n_{t-1}$ at the past time t-1, and outputs the noise component $\Delta n_{t,t-1}$ to the first add-up unit 74.

The first multiplication unit 73-2 receives the noise component delayed by twice the delay D from the first delay unit 71-2, and a pattern index from the index convertor 64. The first multiplication unit 73-2 has a table in which a plurality of pattern indexes is associated with a noise correlation coefficient $w_{aat-2}$. The first multiplication unit 73-2 selects the noise correlation coefficient $w_{aat-2}$ corresponding to the received pattern index according to the table. The first multiplication unit 73-2 multiplies the noise component, delayed by twice the delay D, by the noise correlation coefficient $w_{aat-2}$ to produce the noise component $\Delta n_{t,t-2}$ which the noise component $n_t$ at the present time t receives from the noise component $n_{t-2}$ at the past time t-2, and outputs the noise component $\Delta n_{t,t-2}$ to the first add-up unit 74.

The first add-up unit 74 adds up the noise component $n_t$ output from the multiplication unit 72, the noise component $\Delta n_{t,t-1}$ output from the first multiplication unit 73-1, and the noise component $\Delta n_{t,t-2}$ output from the first multiplication unit 73-2. The first add-up unit 74 performs the addition expressed by Equation 13 described below to obtain the add-up result which is the noise component n11. The first add-up unit 74 outputs the noise component n11 to the first correction unit 61, the first delay unit 71-1, and the third multiplication unit 75-0.

$$n11 = n_t + \Delta n_{t,t-1} + \Delta n_{t,t-2} \quad \text{Equation 13}$$

The plurality of the third multiplication units 75-0, 75-1, and 75-2 multiplies each of the noise component n11 estimated by the first estimation unit 70 and noise components output from first delay units of different stages among the multiple stages of first delay units 71-1 and 71-2 by the noise interference correlation coefficient (see Equation 11) corresponding to time correlation characteristic of the noise interference component, and outputs the obtained product as the noise interference component.

For example, the third multiplication unit 75-0 receives the noise component n11 from the first add-up unit 74, and a pattern index from the index convertor 64. The third multiplication unit 75-0 has a table in which a plurality of pattern indexes is associated with a noise correlation coefficient $w_{abt}$. The first multiplication unit 73-1 selects the noise correlation coefficient $w_{abt}$ corresponding to the received pattern index according to the table, and multiplies the noise component n11 by the noise correlation coefficient $w_{abt}$. Thereby, the third multiplication unit 75-0 produces the noise interference component $\Delta n_{ab,t}$ at the present time t, and outputs the noise component $\Delta n_{ab,t}$ to the third add-up unit 76.

The third multiplication unit 75-1 receives the noise component delayed by the delay D from the first delay unit 71-1, and a pattern index from the index convertor 64. The third multiplication unit 75-1 has a table in which a plurality of pattern indexes is associated with a noise correlation coefficient $w_{abt-1}$. The third multiplication unit 75-1 selects the noise correlation coefficient $w_{abt-1}$ corresponding to the received pattern index according to the table, and multiplies the noise component, delayed by the delay D, by the noise correlation coefficient $w_{abt-1}$. Thereby, the third multiplication unit 75-1 produces a noise interference component $\Delta n_{ab,t-1}$ at the past time t-1, and outputs the noise interference component $\Delta n_{ab,t-1}$ to the third add-up unit 76.

The third multiplication unit 75-2 receives the noise component delayed by twice the delay D from the first delay unit 71-2, and a pattern index from the index convertor 64. The third multiplication unit 75-2 has a table in which a plurality of pattern indexes is associated with a noise correlation coefficient $w_{abt-2}$. The third multiplication unit 75-2 selects the noise correlation coefficient $w_{abt-2}$ corresponding to the received pattern index according to the table. The third multiplication unit 75-2 multiplies the noise component, delayed by twice the delay D, by the noise correlation coefficient $w_{abt-2}$ to produce a noise interference component $\Delta n_{ab,t-2}$ at the past time t-2, and outputs the noise interference component $\Delta n_{ab,t-2}$ to the third add-up unit 76.

The third add-up unit 76 adds up the noise interference component $n_{ab,t}$ output from the third multiplication unit 75-0, the noise interference component $\Delta n_{ab,t-1}$ output from the third multiplication unit 75-1, and the noise component $\Delta n_{ab,t-2}$ output from the third multiplication unit 75-2. The third add-up unit 76 performs the addition expressed by Equation 14 described below to obtain the add-up result which is the noise interference component n12. The third add-up unit 76 outputs the noise interference component n12 to the second correction unit 62.

$$n12 = \Delta n_{ab,t} + \Delta n_{ab,t-1} + \Delta n_{ab,t-2} \qquad \text{Equation 14}$$

The second estimation unit 80 estimates the noise component n22 in the second correction signal y2 according to time correlation characteristic of the noise component. The second estimation unit 80 also estimates the noise interference component n21, which interferes with the first correction signal y1, in the second correction signal y2, according to time correlation characteristic of the noise interference component. That is, the second estimation unit 80 calculates the noise component n22 of the second track (track B) based on the noise component of the second track at the first time (time t) and the noise component of the second track at the second time (time t-1 and t-2) which is earlier than the first time. Along with this, the second estimation unit 80 calculates the noise interference component n21 of the second track based on the noise interference component of the second track at the first time and the noise interference component of the second track at the second time. The second estimation unit 80 supplies the noise component n22 to the second correction unit 62 and the noise interference component n21 to the first correction unit 61.

For example, the second estimation unit 80 includes multiple stages of second delay units 81-1 and 81-2, a multiplication unit 82, a plurality of fourth multiplication units 83-1 and 83-2, a fourth add-up unit 84, a plurality of second multiplication units 85-0, 85-1, and 85-2, and a second add-up unit 86.

The multiple stages of second delay units 81-1 and 81-2 produce a plurality of noise components having different delays from the noise component n11 estimated by the second estimation unit 80. For example, the second delay unit 81-1 receives the noise component n22 from the fourth add-up unit 84 and delays the noise component n22 by the delay D. The second delay unit 81-1 outputs the noise component delayed by the delay D to the fourth multiplication unit 83-1, the second delay unit 81-2, and the second multiplication unit 85-1. The second delay unit 81-2 further delays, by the delay D, the noise component already delayed by the delay D, and outputs the noise component delayed by twice the delay D to the fourth multiplication unit 83-2 and the second multiplication unit 85-2.

The multiplication unit 82 receives a noise basic component 'e' from the equalization processing unit 63, and a pattern index from the index convertor 64. The pattern index is an identifier for identifying the path to which the pattern label 641 including the recording bit string of the two tracks corresponds among a plurality of paths to be processed by the equalization processing unit 63. The multiplication unit 82 has a table in which a plurality of pattern indexes is associated with a noise producing coefficient 'S'. The multiplication unit 82 selects the noise producing coefficient S corresponding to the received pattern index according to the table. The multiplication unit 82 multiplies the noise basic component 'e' by the noise producing coefficient 'S' to produce the noise component $n_t$ at the present time t, and outputs the noise component $n_t$ to the fourth add-up unit 84.

The plurality of the fourth multiplication units 83-1 and 83-2 multiplies each of noise components output from second delay units of different stages among the multiple stages of second delay units 81-1 and 81-2 by the noise correlation coefficient (see Equation 8) corresponding to time correlation characteristic of the noise component, and outputs the obtained product as a noise component.

For example, the fourth multiplication unit 83-1 receives the noise component delayed by the delay D from the second delay unit 81-1, and a pattern index from the index convertor 64. The fourth delay unit 83-1 has a table in which a plurality of pattern indexes is associated with a noise correlation coefficient $w_{bbt-1}$. The fourth multiplication unit 83-1 selects the noise correlation coefficient $w_{bbt-1}$ corresponding to the received pattern index according to the table, and multiplies the noise component, delayed by the delay D, by the noise correlation coefficient $w_{bbt-1}$. Thereby, the fourth multiplication unit 83-1 produces the noise component $\Delta n_{t,t-1}$ which the noise component $n_t$ at the present time t receives from the noise component $n_{t-1}$ at the past time t-1, and outputs the noise component $\Delta n_{t,t-1}$ to the fourth add-up unit 84.

The fourth multiplication unit 83-2 receives the noise component delayed by twice the delay D from the second delay unit 81-2, and a pattern index from the index convertor 64. The fourth multiplication unit 83-2 has a table in which a plurality of pattern indexes is associated with a noise correlation coefficient $w_{bbt-2}$. The fourth multiplication unit 83-2 selects the noise correlation coefficient $w_{bbt-2}$ corresponding to the received pattern index according to the table. The fourth multiplication unit 83-2 multiplies the noise component, delayed by twice the delay D, by the noise correlation coefficient $w_{bbt-2}$ to produce the noise component $\Delta n_{t,t-2}$ which the noise component $n_t$ at the present time t receives from the noise component $n_{t-2}$ at the past time t-2, and outputs the noise component $\Delta n_{t,t-2}$ to the fourth add-up unit 84.

The fourth add-up unit 84 adds up the noise component $n_t$ output from the multiplication unit 82, the noise component $\Delta n_{t,t-1}$ output from the fourth multiplication unit 83-1, and the noise component $\Delta n_{t,t-2}$ output from the fourth multiplication unit 83-2. The fourth add-up unit 84 performs the addition expressed by Equation 15 described below to obtain the add-up result which is the noise component n22. The fourth add-up unit 84 outputs the noise component n22 to the second correction unit 62, the second delay unit 81-1, and the second multiplication unit 85-0.

$$n22 = n_t = \Delta n_{t,t-1} + \Delta n_{t,t-2} \qquad \text{Equation 15}$$

The plurality of the second multiplication units 85-0, 85-1, and 85-2 multiplies each of the noise component n22 estimated by the second estimation unit 80 and noise components output from second delay units of different stages among the multiple stages of second delay units 81-1 and 81-2 by the noise interference correlation coefficient (see Equation 10) corresponding to time correlation characteristic of the noise interference component, and outputs the obtained product as the noise interference component.

For example, the second multiplication unit 85-0 receives the noise component n22 from the fourth add-up unit 84, and a pattern index from the index convertor 64. The second delay unit 85-0 has a table in which a plurality of pattern indexes is associated with a noise correlation coefficient $w_{bat}$. The fourth multiplication unit 83-1 selects the noise correlation coefficient $w_{bat}$ corresponding to the received pattern index according to the table, and multiplies the noise component n22 by the noise correlation coefficient $w_{bat}$. Thereby, the second multiplication unit 85-0 produces a noise interference component $\Delta n_{ba,t}$ at the present time t, and outputs the noise interference component $\Delta n_{ba,t}$ to the second add-up unit 86.

The second multiplication unit 85-1 receives the noise component delayed by the delay D from the second delay unit 81-1, and a pattern index from the index convertor 64. The second multiplication unit 85-1 has a table in which a plurality of pattern indexes is associated with a noise correlation coefficient $w_{bat-1}$. The second multiplication unit 85-1 selects the noise correlation coefficient $w_{bat-1}$ corresponding to the received pattern index according to the table, and multiplies the noise component, delayed by the delay D, by the noise correlation coefficient $w_{bat-1}$. Thereby, the second multiplication unit 85-1 produces the noise interference component $\Delta n_{bat-1}$ at the past time t-1, and outputs the noise interference component $\Delta n_{ba,t-1}$ to the second add-up unit 86.

The second multiplication unit 85-2 receives the noise component delayed by twice the delay D from the second delay unit 81-2, and a pattern index from the index convertor 64. The second delay unit 85-2 has a table in which a plurality of pattern indexes is associated with a noise correlation coefficient $w_{bat-2}$. The second multiplication unit 85-2 selects the noise correlation coefficient $w_{bat-2}$ corresponding to the received pattern index according to the table. The second multiplication unit 85-2 multiplies the noise component, delayed by twice the delay D, by the noise correlation coefficient $w_{bat-2}$ to produce the noise interference component $\Delta n_{ba,t-2}$ at the past time t-2, and outputs the noise interference component $\Delta n_{ba,t-2}$ to the second add-up unit 86.

The second add-up unit 86 adds up the noise interference component $n_{ba,t}$ output from the second multiplication unit 85-0, the noise interference component $\Delta n_{ba,t-1}$ output from the second multiplication unit 85-1, and the noise component $\Delta n_{ba,t-2}$ output from the second multiplication unit 85-2. The second add-up unit 86 performs the addition expressed by Equation 16 described below to obtain the add-up result which is the noise interference component n21. The second add-up unit 86 outputs the noise interference component n21 to the first correction unit 61.

$$n21 = \Delta n_{ba,t} + \Delta n_{ba,t-1} + \Delta n_{ba,t-2} \qquad \text{Equation 16}$$

The first correction unit 61 corrects the first correction signal y1 using the noise component n11 estimated by the second estimation unit 80 and the noise interference component n21 estimated by the second estimation unit 80. For example, the first correction unit 61 includes subtraction units 611 and 612. The subtraction unit 611 subtracts the noise component n11 from the first correction signal y1 and supplies the subtraction result to the subtraction unit 612. The subtraction unit 612 subtracts the noise interference component n21 from the subtraction result obtained by the subtraction unit 611. Thereby, the first correction unit 61 performs the calculation expressed by Equation 17 described below. The first correction unit 61 supplies the corrected first correction signal s1 to the equalization processing unit 63.

$$s1 = y1 - n11 - n21 \qquad \text{Equation 17}$$

The second correction unit 62 corrects the second correction signal y2 using the noise component n22 estimated by the second estimation unit 80 and the noise interference component n12 estimated by the second estimation unit 80. For example, the second correction unit 62 includes subtraction units 621 and 622. The subtraction unit 621 subtracts the noise component n22 from the second correction signal y2 and supplies the subtraction result to the subtraction unit 622. The subtraction unit 622 subtracts the noise interference component n12 from the subtraction result obtained by the subtraction unit 621. Thereby, the second correction unit 62 performs the calculation expressed by Equation 18 described below. The second correction unit 62 supplies the corrected second correction signal s2 to the equalization processing unit 63.

$$s2 = y2 - n22 - n12 \qquad \text{Equation 18}$$

The equalization processing unit 63 calculates the likelihood (branch metric M expressed by Equation 3) of the first correction signal s1 using the first correction signal s1 corrected by the first correction unit 61, and equalizes the first correction signal s1 according to the calculated likelihood. Along with this, the equalization processing unit 63 calculates the likelihood (branch metric M expressed by Equation 3) of the second correction signal s2 using the second correction signal s2 corrected by the second correction unit 62, and equalizes the second correction signal s2 according to the calculated likelihood. The equalization processing unit 63 produces read data including the equalized first correction signal s1 and the equalized second correction signal s2. The equalization processing unit 63 supplies the produced read data to the decoder 90.

For example, the equalization processing unit 63 includes a two-input Viterbi detector 631. The two-input Viterbi detector 631 has two input systems, that is, the input system for receiving a signal from the first correction unit 61 and the input system for receiving a signal from the second correction unit 62. The two-input Viterbi detector 631 can equalize the first correction signal s1 and the second correction signal s2 in parallel and simultaneous. The two-input Viterbi detector 631 obtains a total sum of the branch metric M (path metric) for each of a plurality of paths with regard to the first correction signal s1. Then, the two-input Viterbi detector 631 selects, among the plurality of paths, a path with the smallest total sum of the branch metric M (path metric) as the maximum likelihood path for the first correction signal s1, and equalizes the first correction signal s1 to the data series corresponding to the selected path. Further, the two-input Viterbi detector 631 obtains the total sum of the branch metric M (path metric) for each of a plurality of paths with regard to the first correction signal s2. Then, the two-input Viterbi detector 631 selects, among the plurality of paths, a path with the smallest total sum of the branch metric M (path metric) as the maximum likelihood path, and equalizes the second correction signal s2 to the data series corresponding to the selected path.

Further, the two-input Viterbi detector 631 informs the index convertor 64 of the bit label (pattern label 641) corresponding to the focused path (bit sequence).

The index convertor 64 converts the informed pattern label 641 into a corresponding pattern index. The index convertor 64 supplies the converted pattern index to each of the multiplication unit 72, the plurality of first multiplication units 73-1 and 73-2, the plurality of third multiplication units 75-0, 75-1, and 75-2, the multiplication unit 82, the plurality of fourth multiplication units 83-1 and 83-2, and the plurality of second multiplication units 85-0, 85-1, an 85-2.

The decoder 90 receives the read data from the Viterbi equalizer 60. The decoder 90 recognizes each of a data portion and an LDPC code in the read data, and decodes the LDPC code by applying LDPC decoding processing to the LDPC code. The LDPC code is previously encoded and included in the write data when the data is written and is used for correcting errors. The decoder 90 performs correction processing to correct an error in the data portion using the decoded LDPC code. That is, the decoder 90 corrects the error of each bit in the data portion to restore the user data. The description is made for the controller CTR correcting an error according to the LDPC method during writing and readout of data as an example. However, a method for correcting errors other than the LDPC method may be used.

Figure 7:
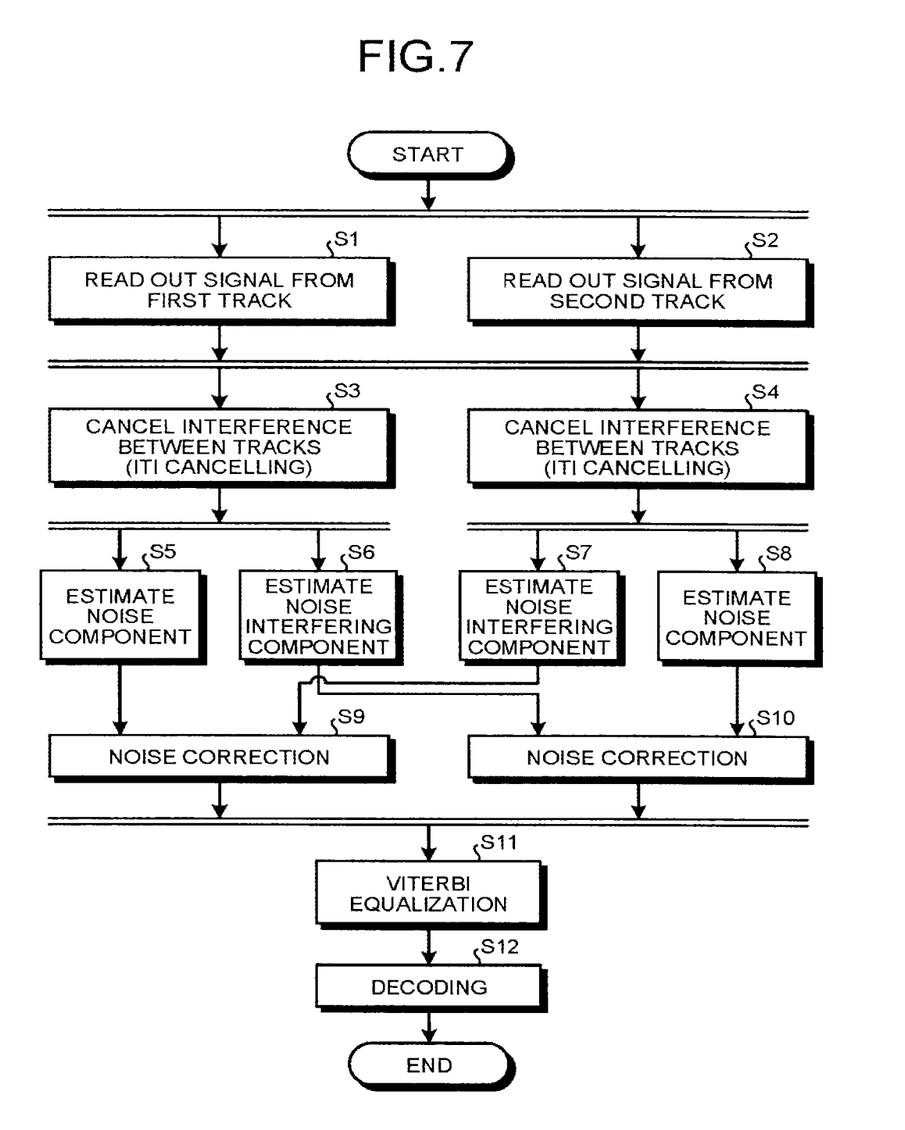
FIG. 7 is a flowchart illustrating an operation of the controller of the embodiment.

Next, the operation of the disk drive 1 will be described using FIG. 7. FIG. 7 is a flowchart illustrating the operation of the disk drive 1.

The disk drive 1 performs in parallel an operation (S1) of reading out the read signal $RS_A$ from the first track (track A) using the read head 22b1 and an operation (S2) of reading out the read signal $RS_B$ from the second track (track B) using the read head 22b2.

The interference canceller 50 produces the first correction signal y1 by cancelling the signal interference component $S_A'$ from the second track (track B) in the read signal $RS_A$ read out from the first track (track A) (S3). Along with this, the interference canceller 50 produces a second correction signal y2 by cancelling the signal interference component $S_B'$ from the first track (track A) in the read signal $RS_B$ read out from the second track (track B) (S4). The processing in S3 and the processing in S4 are performed in parallel.

The Viterbi equalizer 60 estimates the noise component n1 in the first correction signal y1 according to the time correlation characteristic of the noise component (S5). The Viterbi equalizer 60 estimates the noise interference component n12, which interferes with the second correction signal y2, in the estimated first correction signal y1, according to time correlation characteristic of the noise interference component (S6). The processing in S5 and the processing in S6 are performed according to completion of the processing in S3.

The Viterbi equalizer 60 estimates the noise interference component n21, which interferes with the first correction signal y1, in the estimated second correction signal y2, according to time correlation characteristic of the noise interference component (S7). The Viterbi equalizer 60 estimates the noise component n22 in the second correction signal y2 according to time correlation characteristic of the noise component (S8). The processing in S7 and the processing in S8 are performed according to completion of the processing in S4.

The Viterbi equalizer 60 estimates the noise n1 included in the first correction signal y1 using the noise component n11 estimated in S5 and the noise interference component n21 estimated in 37. The Viterbi equalizer 60 corrects the first correction signal y1 using the estimated noise n1 (S9). The Viterbi equalizer 60 estimates the noise n2 included in the second correction signal y2 using the noise component n22 estimated in S8 and the noise interference component n12 estimated in S6. The Viterbi equalizer 60 corrects the second correction signal y2 using the estimated noise n2 (S10).

The Viterbi equalizer 60 calculates the likelihood (branch metric M expressed by Equation 3) of the first correction signal s1 using the first correction signal s1 corrected in S9, and equalizes the first correction signal s1 according to the calculated likelihood. Along with this, the Viterbi equalizer 60 calculates the likelihood (branch metric M expressed by Equation 3) of the second correction signal s2 using the second correction signal s2 corrected in S10, and equalizes the second correction signal s2 according to the calculated likelihood (S11). In FIG. 7, the first processing and the second processing are performed in parallel. The first processing includes estimation of the noise component n11 in the first correction signal y1 (S5), estimation of the noise interference component n21 in the second correction signal y2 (S7), correction of the first correction signal y1 (S9), calculation of the likelihood of the corrected first correction signal s1 (S11), and equalization of the first correction signal s1 (S11). The second processing includes estimation of the noise interference component n12 in the first correction signal y1 (S6), estimation of the noise component n22 in the second correction signal y2 (S8), correction of the second correction signal y2 (S10), calculation of the likelihood of the corrected second correction signal s2 (S11), and equalization of the second correction signal s2 (S11).

The equalization processing unit 63 produces read data including the equalized first correction signal s1 and the equalized second correction signal s2. The equalization processing unit 63 supplies the produced read data to the decoder 90. The decoder 90 receives the read data from the Viterbi equalizer 60. The decoder 90 performs decoding and error correction of the LDPC code to restore the user data (S12).

As described above, in the disk drive 1 of the embodiment, correlation components of interference and noise in the signal read out from a plurality of adjacent tracks using the different read heads are estimated and made to cancel each other. That is, the Viterbi equalizer 60 estimates the noise included in the first correction signal y1 by using the noise component in the first correction signal y1 which is estimated according to time correlation characteristic of the noise component and by using the noise interference component in the second correction signal y2 which interferes with the first correction signal y1 and which is estimated according to time correlation characteristic of the noise interference component. Further, the Viterbi equalizer 60 estimates the noise included in the second correction signal y2 by using the noise component in the second correction signal y2 which is estimated according to time correlation characteristic of the noise component and by using the noise interference component in the first correction signal y1 which interferes with the second correction signal y2 and which is estimated according to time correlation characteristic of the noise interference component. In this manner, noise power can be reduced for each of the plurality of signals read out from the plurality of adjacent tracks, thereby improving read characteristic. That is, the noise included in the read signal obtained by two different read heads 22b1 and 22b2 can be estimated accurately. Thereby, the noise can efficiently be suppressed and whitened. In this manner, the influence of the noise from the adjacent track can efficiently be eliminated so that the track width of the magnetic disk 11 can easily be made narrow, raising the track recording density. As a result, a high capacity drive can be provided.

It should be noted that, as for the configuration for switching the noise correlation coefficient and the noise interfering correlation coefficient according to the pattern label (recording bit string of two tracks) to be processed in the equalization processing unit 63, each of the multiplication unit 72, the plurality of first multiplication units 73-1 and 73-2, the plurality of third multiplication units 75-0, 75-1, and 75-2, the multiplication unit 82, the plurality of fourth multiplication units 83-1 and 83-2, and the plurality of second multiplication units 85-0, 85-1, and 85-2 may be multiplexed by the number of patterns. In this case, the disk drive 1 may have a configuration in which the index convertor 64 is omitted from the configuration illustrated in FIG. 4.

Alternatively, each of the multiplication unit 72, the plurality of first multiplication units 73-1 and 73-2, the plurality of third multiplication units 75-0, 75-1, and 75-2, the multiplication unit 82, the plurality of fourth multiplication units 83-1 and 83-2, and the plurality of second multiplication units 85-0, 85-1, and 85-2 may be multiplexed by 'the number of pattern'/N (N: integer of 2 or more). In this case, the index convertor 64 can send information on N types of the patter index to the multiplication unit 72, the plurality of first multiplication units 73-1 and 73-2, the plurality of third multiplication units 75-0, 75-1, and 75-2, the multiplication unit 82, the plurality of fourth multiplication units 83-1 and 83-2, and the plurality of second multiplication units 85-0, 85-1, and 85-2. In this manner, the configuration of the index convertor 64 can be simplified.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A controller comprising:
    an interference canceller configured to produce a first correction signal and a second correction signal, the first correction signal being obtained by cancelling a signal interference component from a second track in a signal of a first track, the second correction signal being obtained by cancelling a signal interference component from the first track in a signal of the second track, the first track and the second track being adjacent to each other in a disk medium;
    an equalizer configured to obtain a noise included in the first correction signal by using a noise component of the first track and a noise interference component from the second track, correct the first correction signal by using the obtained noise, and equalize the corrected first correction signal, the noise component of the first track being calculated based on a noise component of the first track at a first timing and a noise component of the first track at a second timing which is earlier than the first timing, the noise interference component from the second track being calculated based on a noise interference component from the second track at the first timing and a noise interference component from the second track at the second timing; and
    a decoder configured to decode the equalized first correction signal.

2. The controller according to claim 1, wherein the equalizer includes
    a first calculation unit configured to calculate a noise component of the first track based on a noise component of the first track at the first timing and a noise component of the first track at the second timing,
    a first correction unit configured to correct the first correction signal by using at least a noise component calculated by the first calculation unit, and
    an equalization processing unit configured to calculate likelihood of the first correction signal by using the first correction signal corrected by the first correction unit and equalize the first correction signal based on the calculated likelihood.

3. The controller according to claim 2, wherein the first calculation unit includes
    multiple stages of first delay units configured to produce a plurality of noise components having different delays from a noise component calculated by the first calculation unit,
    a plurality of first multiplication units configured to multiply each of noise components output from the first delay units of different stages among the multiple stages of first delay units by a noise correlation coefficient corresponding to timing correlation characteristic of the noise component, and output an obtained product as a noise component, and
    a first add-up unit configured to add up noise components output from the plurality of first multiplication units and output an add-up result to the first correction unit and the multiple stages of first delay units.

4. The controller according to claim 2, wherein the equalizer further includes a second calculation unit configured to calculate a noise interference component from the second track based on a noise interference component from the second track at the first timing and a noise interference component from the second track at the second timing,
    wherein the first correction unit is configured to correct the first correction signal by using a noise component calculated by the first calculation unit and a noise interference component calculated by the second calculation unit.

5. The controller according to claim 4, wherein the second calculation unit includes
    multiple stages of second delay units configured to produce a plurality of noise components having different delays from a noise component calculated by the second calculation unit,
    a plurality of second multiplication units configured to multiply each of a noise component calculated by the second calculation unit and noise components output from different stages of second delay units among the multiple stages of second delay units by a noise interference correlation coefficient corresponding to timing correlation characteristic of a noise interference component, and output an obtained product as a noise interference component, and
    a second add-up unit configured to add up noise interference components output from the plurality of second multiplication units and output an add-up result to the first correction unit.

6. The controller according to claim 1, wherein the equalizer is configured to obtain a noise included in the second correction signal by using a noise component of the second track and a noise interference component from the first track, calculate likelihood of the second correction signal by using the obtained noise, and equalize the second correction signal according to the calculated likelihood, the noise component of the second track being calculated based on a noise component of the second track at the first timing and a noise component of the second track at the second timing, the noise interference component from the first track being calculated based on a noise interference component from the first track at the first timing and a noise interference component from the first track at the second timing, and wherein the decoder decodes one or both of the equalized first correction signal and the equalized second correction signal.

7. The controller according to claim 6, wherein the equalizer includes a first calculation unit configured to calculate a noise component of the first track based on a noise component of the first track at the first timing and a noise component of the first track at the second timing, and also calculate a noise interference component from the first track based on a noise interference component from the first track at the first timing and a noise interference component from the first track at the second timing, a second calculation unit configured to calculate a noise component of the second track based on a noise component of the second track at the first timing and a noise component of the second track at the second timing, and also calculate a noise interference component from the second track based on a noise interference component from the second track at the first timing and a noise interference component from the second track at the second timing, a first correction unit configured to correct the first correction signal by using a noise component calculated by the first calculation unit and a noise interference component calculated by the second calculation unit, a second correction unit configured to correct the second correction signal by using a noise component calculated by the second calculation unit and a noise interference component calculated by the first calculation unit, and an equalization processing unit configured to calculate likelihood of the first correction signal by using the first correction signal corrected by the first correction unit and then equalize the first correction signal according to the calculated likelihood, and to calculate likelihood of the second correction signal by using the second correction signal corrected by the second correction unit and then equalize the second correction signal according to the calculated likelihood.

8. The controller according to claim 7, wherein the first calculation unit includes multiple stages of first delay units configured to produce a plurality of noise components having different delays from a noise component calculated by the first calculation unit, a plurality of first multiplication units configured to multiply each of noise components output from first delay units of different stages among the first delay units of multiple stages by a noise correlation coefficient corresponding to timing correlation characteristic of a noise component, and output an obtained product as a noise component, a plurality of third multiplication units configured to multiply each of a noise component calculated by the first calculation unit and noise components output from first delay units of different stages among the first delay units of multiple stages by a noise interference correlation coefficient corresponding to timing correlation characteristic of a noise interference component, and output an obtained product as a noise interference component, a first add-up unit configured to add up noise components output from the plurality of first multiplication units and output an add-up result to the first correction unit and the first delay units of multiple stages, and a third add-up unit configured to add up noise interference components output from the plurality of third multiplication units and output an add-up result to the second correction unit, and wherein the second calculation unit includes multiple stages of second delay units configured to produce a plurality of noise components having different delays from a noise component calculated by the second calculation unit, a plurality of fourth multiplication units configured to multiply each of noise components output from second delay units of different stages among the second delay units of multiple stages by a noise correlation coefficient corresponding to timing correlation characteristic of the noise component, and output an obtained product as a noise component, a plurality of second multiplication units configured to multiply each of a noise component calculated by the second calculation unit and noise components output from second delay units of different stages among the second delay units of multiple stages by a noise interference correlation coefficient corresponding to timing correlation characteristic of a noise interference component, and output an obtained product as a noise interference component, a fourth add-up unit configured to add up noise components output from the plurality of fourth multiplication units and output an add-up result to the second correction unit and the second delay units of multiple stages, and a second add-up unit configured to add up noise interference components output from the plurality of second multiplication units and output an add-up result to the first correction unit.

9. A disk drive comprising:

a first head configured to read out a signal from a first track on a disk medium;

a second head configured to read out a signal from a second track adjacent to the first track on the disk medium;

an interference canceller configured to produce a first correction signal and a second correction signal, the first correction signal being obtained by cancelling a signal interference component from the second track in a signal of the first track, the second correction signal being obtained by cancelling a signal interference component from the first track in a signal of the second track;

an equalizer configured to obtain a noise included in the first correction signal by using a noise component of the first track and a noise interference component from the second track, calculate likelihood of the first correction signal using the obtained noise, and equalize the first correction signal according to the calculated likelihood, the noise component of the first track being calculated based on a noise component of the first track at a first timing and a noise component of the first track at a second timing which is earlier than the first timing, the noise interference component from the second track being calculated based on a noise interference component from the second track at the first timing and a noise interference component from the second track at the second timing; and a decoder configured to decode the equalized first correction signal.

10. The disk drive according to claim 9, wherein the equalizer includes
a first calculation unit configured to calculate a noise component of the first track based on a noise component of the first track at the first timing and a noise component of the first track at the second timing,
a first correction unit configured to correct the first correction signal by using at least a noise component calculated by the first calculation unit, and
an equalization processing unit configured to calculate likelihood of the first correction signal by using the first correction signal corrected by the first correction unit, and equalize the first correction signal based on the calculated likelihood.

11. The disk drive according to claim 10, wherein the first calculation unit includes
multiple stages of first delay units configured to produce a plurality of noise components having different delays from a noise component calculated by the first calculation unit,
a plurality of first multiplication units configured to multiply each of noise components output from first delay units of different stages among the first delay units of multiple stages by a noise correlation coefficient corresponding to timing correlation characteristic of a noise component, and output an obtained product as a noise component, and
a first add-up unit configured to add up noise components output from the plurality of first multiplication units, and output an add-up result to the first correction unit and the first delay units of multiple stages.

12. The disk drive according to claim 10, wherein the equalizer further includes a second calculation unit configured to calculate a noise interference component from the second track based on a noise interference component from the second track at the first timing and a noise interference component from the second track at the second timing, and
wherein the first correction unit corrects the first correction signal by using a noise component calculated by the first calculation unit and a noise interference component calculated by the second calculation unit.

13. The disk drive according to claim 12, wherein the second calculation unit includes
second delay units of multiple stages configured to produce a plurality of noise components having different delays from a noise component calculated by the second calculation unit,
a plurality of second multiplication units configured to multiply each of a noise component calculated by the second calculation unit and noise components output from different stages of second delay units among multiple stages of the second delay units by a noise interference correlation coefficient corresponding to timing correlation characteristic of a noise interference component, and output an obtained product as a noise interference component, and
a second add-up unit configured to add up noise interference components output from the plurality of second multiplication units, and output an add-up result to the first correction unit.

14. The disk drive according to claim 9, wherein
the equalizer is configured to obtain a noise included in the second correction signal by using a noise component of the second track and a noise interference component from the first track, calculate likelihood of the second correction signal by using the obtained noise, and equalize the second correction signal according to the calculated likelihood, the noise component of the second track being calculated based on a noise component of the second track at the first timing and a noise component of the second track at the second timing, the noise interference component from the first track being calculated based on a noise interference component from the first track at the first timing and a noise interference component from the first track at the second timing, and
wherein the decoder decodes one or both of the equalized first correction signal and the equalized second correction signal.

15. The disk drive according to claim 14, wherein the equalizer includes
a first calculation unit configured to calculate a noise component of the first track based on a noise component of the first track at the first timing and a noise component of the first track at the second timing, and also calculate a noise interference component from the first track based on a noise interference component from the first track at the first timing and a noise interference component from the first track at the second timing,
a second calculation unit configured to calculate a noise component of the second track based on a noise component of the second track at the first timing and a noise component of the second track at the second timing, and also calculate a noise interference component from the second track based on a noise interference component from the second track at the first timing and a noise interference component from the second track at the second timing,
a first correction unit configured to correct the first correction signal using a noise component calculated by the first calculation unit and a noise interference component calculated by the second calculation unit,
a second correction unit configured to correct the second correction signal using a noise component calculated by the second calculation unit and a noise interference component calculated by the first calculation unit, and
an equalization processing unit configured to calculate likelihood of the first correction signal by using the first correction signal corrected by the first correction unit and then equalize the first correction signal according to the calculated likelihood, and also configured to calculate likelihood of the second correction signal using the second correction signal corrected by the second correction unit and then equalize the second correction signal according to the calculated likelihood.

16. The disk drive according to claim 15, wherein the first calculation unit includes
multiple stages of first delay units configured to produce a plurality of noise components having different delays from a noise component calculated by the first calculation unit,
a plurality of first multiplication units configured to multiply each of noise components output from different stages of first delay units among the multiple stages of first delay units by a noise correlation coefficient corresponding to timing correlation characteristic of a noise component, and output an obtained product as a noise component,
a plurality of third multiplication units configured to multiply each of a noise component calculated by the first calculation unit and noise components output from different stages of first delay units among the multiple stages of first delay units by a noise interference correlation coefficient corresponding to timing correlation characteristic of a noise interference component, and output an obtained product as a noise interference component, a first add-up unit configured to add up noise components output from the plurality of first multiplication units and output an add-up result to the first correction unit and the first delay units of multiple stages, and a third add-up unit configured to add up noise interference components output from the plurality of third multiplication units and output an add-up result to the second correction unit, and wherein the second calculation unit includes second delay units of multiple stages configured to produce a plurality of noise components having different delays from a noise component calculated by the second calculation unit, a plurality of fourth multiplication units configured to multiply each of noise components output from different stages of second delay units among the multiple stages of second delay units by a noise correlation coefficient corresponding to timing correlation characteristic of a noise component, and output an obtained product as a noise component, a plurality of second multiplication units configured to multiply each of a noise component calculated by the second calculation unit and noise components output from different stages of second delay units among the multiple stages of second delay units by a noise interference correlation coefficient corresponding to timing correlation characteristic of a noise interference component, and output an obtained product as a noise interference component, a fourth add-up unit configured to add up noise components output from the plurality of fourth multiplication units, and output an add-up result to the second correction unit and the second delay units of multiple stages, and a second add-up unit configured to add up noise interference components output from the plurality of second multiplication units, and output an add-up result to the first correction unit.

17. The disk drive according to claim 9, wherein the interference canceller includes a first filter configured to extract a signal component, from a signal read out from the first track, a second filter configured to extract a signal interference component, from a signal read out from the second track, a first cancel processing unit configured to produce the first correction signal by using a signal component extracted by the first filter and a signal interference component extracted by the second filter, a third filter configured to extract a signal interference component, from a signal read out from the first track, a fourth filter configured to extract a signal component, from a signal read out from the second track, and a second cancel processing unit configured to produce the second correction signal by using a signal component extracted by the fourth filter and a signal interference component extracted by the third filter.

18. A read processing method comprising:

reading out a signal from a first track on a disk medium via a first head;

reading out a signal from a second track adjacent to the first track on the disk medium via a second head;

producing a first correction signal obtained by cancelling a signal interference component from the second track in a signal of the first track;

producing a second correction signal obtained by cancelling a signal interference component from the first track in a signal of the second track;

obtaining a noise included in the first correction signal by using a noise component of the first track and a noise interference component from the second track, the noise component of the first track being calculated based on a noise component of the first track at a first timing and a noise component of the first track at a second timing which is earlier than the first timing, the noise interference component from the second track being calculated based on a noise interference component from the second track at the first timing and a noise interference component from the second track at the second timing, correcting the first correction signal by using the obtained noise;

calculating likelihood of the corrected first correction signal;

equalizing the first correction signal according to the calculated likelihood of the first correction signal; and decoding the equalized first correction signal.

19. The read processing method according to claim 18, further comprising:

obtaining a noise included in the second correction signal by using a noise component of the second track and a noise interference component from the first track, the noise component of the second track being calculated based on a noise component of the second track at the first timing and a noise component of the second track at the second timing, the noise interference component from the first track being calculated based on a noise interference component from the first track at the first timing and a noise interference component from the first track at the second timing, correcting the second correction signal by using the obtained noise;

calculating likelihood of the corrected second correction signal;

equalizing the second correction signal according to the calculated likelihood of the second correction signal; and decoding one or both of the equalized first correction signal and the equalized second correction signal.

20. The read processing method according to claim 19, wherein a first processing and a second processing are performed in parallel, the first processing including obtaining of noise included in the first correction signal, correction of the first correction signal, calculation of likelihood of the corrected first correction signal, and equalization of the first correction signal, the second processing including obtaining of noise included in the second correction signal, correction of the second correction signal, calculation of likelihood of the corrected second correction signal, and equalization of the second correction signal.

* * * * *